United States Patent [19]

Robbins

[11] Patent Number: 4,885,606
[45] Date of Patent: Dec. 5, 1989

[54] VACUUM TRANSPORT AND HOLD DOWN BELT FOR AUTOMATIC CAMERA

[75] Inventor: Daniel H. Robbins, Rochester, N.Y.
[73] Assignee: Itek Graphix Corp., Walthan, Mass.
[21] Appl. No.: 212,948
[22] Filed: Jun. 29, 1988
[51] Int. Cl.⁴ ............................................. G03B 27/60
[52] U.S. Cl. ......................................... 355/73; 355/76; 355/87; 355/91
[58] Field of Search ...................... 355/73, 76, 87, 91

[56] References Cited

U.S. PATENT DOCUMENTS

| | | |
|---|---|---|
| 1,234,416 | 7/1917 | Swiegard . |
| 2,519,610 | 8/1950 | Sussin . |
| 3,420,608 | 1/1969 | Canale . |
| 3,617,127 | 11/1971 | McDuff . |
| 3,922,087 | 11/1975 | Dillow . |
| 4,324,487 | 4/1982 | Nishihama . |
| 4,408,872 | 10/1983 | Vaughn . |
| 4,478,511 | 10/1984 | Miyauchi . |
| 4,479,710 | 10/1984 | Vaughn . |
| 4,619,526 | 10/1986 | Hougaard . |
| 4,640,610 | 2/1987 | Rasmussen . |

OTHER PUBLICATIONS

Copy of application Ser. No. 06/920,118, 10-17-86.
Copy of application Ser. No. 07/148,647, 1-28-88.

Primary Examiner—Monroe H. Hayes
Attorney, Agent, or Firm—Morgan & Finnegan

[57] ABSTRACT

A transport belt for an automatic camera vacuum feed and hold down system is provided. The movable, flexible opaque transport belt has a substantially uniform bottom surface facing the exposure platen and a top surface provided with at least one transverse resilient belt flexing member. The belt flexing member is preferably a curved plastic member having memory which assumes a first, curved position to create at least one air channel beneath the belt. The air channels reduce the length of time required to evacuate air beneath the belt. During vacuum hold down for exposure, the resilient belt flexing member assumes a second position, substantially parallel to the platen and the air channels are eliminated, such that the bottom belt surface presents a substantially flat uniform background surface during exposure.

24 Claims, 4 Drawing Sheets

VACUUM TRANSPORT AND HOLD DOWN BELT FOR AUTOMATIC CAMERA

TECHNICAL FIELD

The present invention relates to a vacuum hold-down system for an automatic camera and, more specifically, to an improved vacuum transport and hold down belt.

BACKGROUND AND OBJECTS OF THE INVENTION

U.S. patent application Ser. No. 06/920,118, filed Oct. 17, 1986 entitled "Automatically Operated Vacuum Feed and Hold Down Assembly For Camera System" discloses a daylight-operable vertical camera having an automatic vacuum feed and hold down system. The automatic vacuum feed and hold down system automatically withdraws and cuts a photosensitive sheet, transports the sheet to an exposure platen, centers the sheet, holds the sheet down onto the platen for exposure, and advances the exposed sheet for processing. The system includes a flexible transport belt extending between two rollers, with the belt being lifted away from the exposure platen of the camera during transport of the photosensitive material. Prior to exposure of the photosensitive material the belt is lowered onto the camera platen and air underneath the belt and photosensitive material is evacuated by applying a vacuum to a peripheral channel surrounding the platen.

Certain improvements to the structure and method of operation of the vacuum transport and hold down system disclosed and claimed in the foregoing application are set forth in U.S. patent application Ser. No. 07/149,647, filed Jan. 28, 1988 entitled "Automatic Vacuum Feed and Hold Down Assembly For Camera System". Among the improvements disclosed in the latter application is the inclusion of one or more transverse fabric ribs extending partially across the underside of the belt. The partially extending transverse ribs effectively "tent" the belt above the exposure platen to reduce the time required to evacuate air from beneath the belt during the hold-down phase of operation. The complete disclosures of the foregoing application Ser. Nos. 06/920,118 and 07/149,647 are hereby incorporated by reference, and familiarity with the contents of those disclosures is presumed.

The belt with rib construction has been found effective for its intended purpose, that is, reducing the length of time required for hold down evacuation, and is acceptable for most applications. However, vertical cameras are used, among other things, for lined screen exposures onto film. In this particularly demanding application, light is transmitted through the film and is reflected from the underside of the belt. It has been found that variations in reflectance from the underside of the belt often create retro-reflection shadow variation effects in the image recorded on the photosensitive film. It has further been found that there are variations in reflectance between the lower or bottom surface of the belt and the fabric ribs, which variations contribute to shadow variation effects. Of course, shadow variation effects are undesirable and detract from the quality and usefulness of the resulting film images.

Therefore, it is one object of the present invention to provide a vacuum transport and hold down belt that is not susceptible to retro-reflection shadow variation effects.

It is another object of the present invention to provide a vacuum transport and hold down belt that presents a substantially uniform bottom surface not susceptible to retro-reflection shadow variation effects.

It is a further object of the present invention to provide, in a vacuum transport and hold down system for an automatic camera, a belt that obtains expeditious evacuation of air from beneath the belt without being susceptible to retro-reflection shadow variation effects.

It is another object of the present invention to provide a vacuum transport and hold down belt that obtains expeditious evacuation of air beneath the belt without partial transverse ribs on the underside of the belt.

These and other highly desirable objects are accomplished by the present invention in an economical structure that obtains rapid evacuation of air beneath the belt without partial transverse ribs on the lower belt surface and without undesirable retro-reflection shadow variation effects.

Objects and advantages of the invention are set forth in part herein and in part will be obvious herefrom, or may be learned by practice with the invention, the same being realized and attained by means of the instrumentalities and combinations pointed out in the appended claims.

The invention consists of the novel parts, constructions, arrangements, combinations, steps and improvements herein shown and described.

SUMMARY OF THE INVENTION

In accordance with the present invention an automatic vacuum transport and hold-down system for an automatic camera is provided. The automatic transport and hold down system includes a flexible, opaque vacuum transport belt having at least one resilient belt flexing member attached to the top belt surface. In the preferred embodiment, two partially extending transverse flexing members are provided. The resilient belt flexing members flex the belt in order to "tent" the belt and create one or more air channels underneath the belt. The air channels reduce the length of time required to evacuate air underneath the belt and achieve vacuum hold down for exposure. Remarkably, the downward force on the belt during vacuum hold overcomes the flexing force of the resilient members so that the air channels are eliminated and the bottom belt surface lays flat against the platen and photosensitive material, thereby presenting a uniform background surface during exposure.

In the preferred embodiment, the resilient belt flexing member is a curved plastic section of a cylinder attached at the outer, convex surface thereof to the top belt surface. Transfer adhesive has been found appropriate for attaching the curved plastic member to the belt. The curved plastic member has memory and, when the belt is not subject to vacuum hold down, the curved plastic member assumes a first, rest position retaining its curved shape. In the curved rest position the belt portion attached to the curved plastic member conforms, at least in part, to the shape of the curved plastic member. Consequently, the portions of the belt attached to the ends of the curved plastic member are displaced away from the platen. This effectively "tents" the belt to create a pair of air channels underneath the belt parallel to the plastic members. As vacuum is applied to obtain hold down, the air channels reduce the amount of time required to evacuate air underneath the belt and photosensitive material. However, as vacuum is applied to the channel surrounding the platen, downward force toward the platen is exerted on the belt and, hence, the resilient member. The downward force gradually increases as vacuum continues to be applied and eventually overcomes the flexing memory of the curved plastic member. As a result, the lower belt surface is drawn flat against the photosensitive material and/or platen and the air channels are eliminated. In this, the hold down exposure position, the lower belt surface presents a flat, uniform background surface for exposure. The resilient members, overcome by the downward force exerted on the belt, assume a second, flexed position substantially parallel to the platen.

Advantageously, the curved plastic members resume their natural, curved shape when the hold down vacuum is released after exposure, and are capable of many repetitions of the hold down cycle without losing their curved surface memory. In the preferred embodiment wherein the convex surface of curved plastic members are attached to the top belt, surface as by a transfer adhesive, the curved plastic members conform substantially to the curvature of the belt rollers. Thus, when the belt is wound around the rollers during various stages of operation the curved plastic members conform to the shape of the rollers. This advantageously preserves the curved surface memory of the plastic members, enhancing the longevity of the plastic members and the system as a whole.

In use, the automatic vacuum feed and hold down assembly is activated to withdraw, cut, lift, transport, and center a photosensitive sheet relative to the exposure platen, whereupon the transport belt and photosensitive sheet are lowered onto the exposure platen. Prior to commencement of vacuum hold down, the resilient belt flexing members assume their first, curved position to form partially extending transverse air channels underneath the belt. During vacuum hold down, the air channels reduce the length of time required to evacuate air underneath the belt. However, as the hold down vacuum is continued, the resulting downward force exerted upon the belt and, hence, the resilient members gradually increase and overcome the flexing force of the resilient members. Thus, the belt is drawn flat against the platen and photosensitive material, eliminating the air channels, and the bottom belt surface presents a uniform background surface during exposure.

In numerous alternative embodiments various configurations of resilient belt flexing members and methods of attachment to the top belt surface are set forth.

It will be apparent from the foregoing general description that the objects of the invention specifically enumerated herein are accomplished by the invention as here embodied.

Thus, the vacuum transport belt in accordance with the invention advantageously provides air channels beneath the belt during initial application of hold down vacuum to reduce the length of time required for evacuation. Remarkably, however, the air channels are eliminated at a point when they are no longer needed so that the lower belt surface may lie flat against the platen to present a uniform background surface during exposure. Surprisingly, no protruding ribs are necessary on the lower belt surface in order to obtain rapid evacuation and, consequently, all reflectance variations caused by differences between the belt and rib surfaces are eliminated.

It will be understood that the foregoing general exemplary and explanatory of the invention but are not restrictive thereof.

BRIEF DESCRIPTION OF THE DRAWINGS

The accompanying drawings, referred to herein and constituting a part hereof, illustrate preferred embodiments of the present invention, and together with the description serve to explain the principles of the invention.

DETAILED DESCRIPTION OF THE PREFERRED EMBODIMENTS

Figure 1:
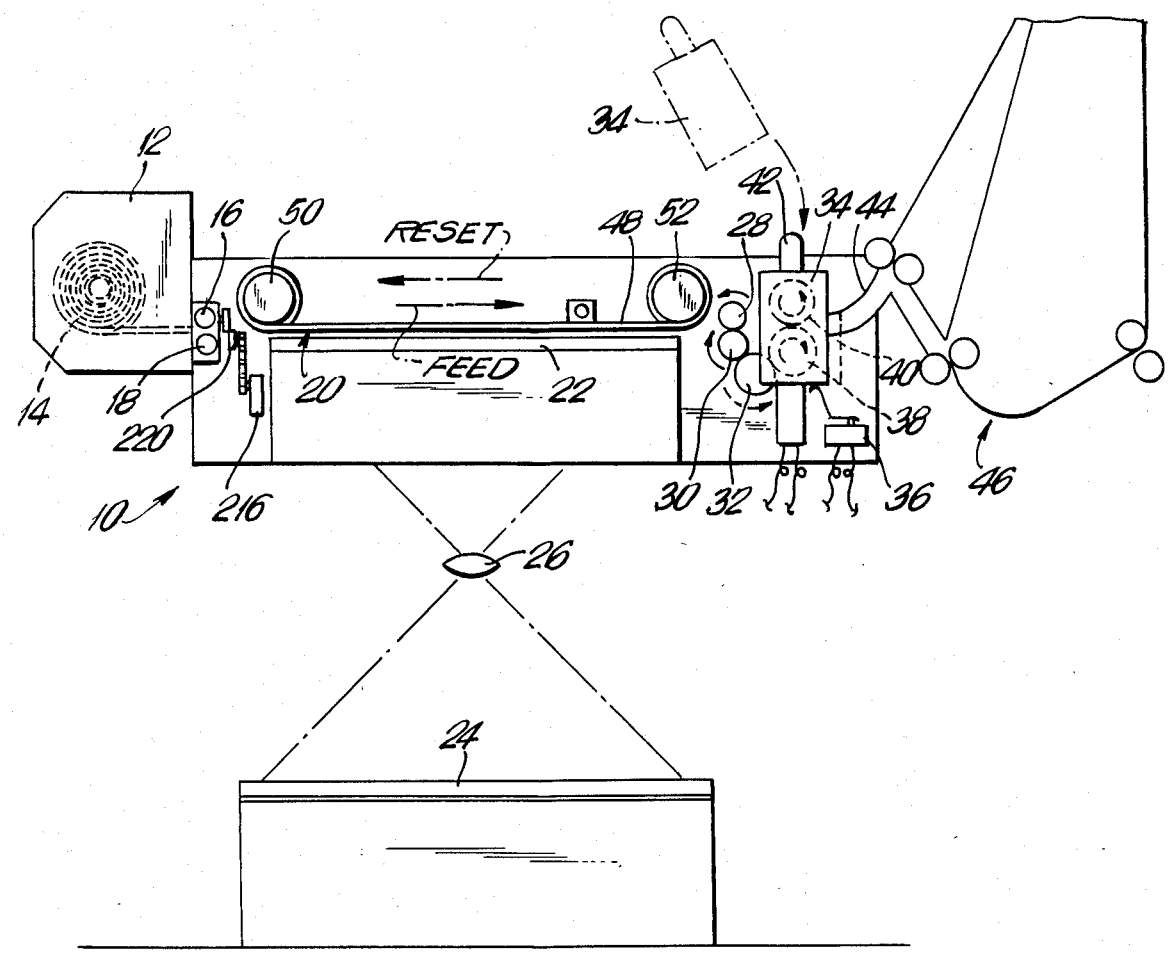
FIG. 1 is a schematic front elevation representation of a vertical camera system of the type pertaining to the present invention.

Referring to the drawings, FIG. 1 substantially corresponds to FIG. 1 of the foregoing application Ser. Nos. 06/920,118 and 07/149,647, and shows the type of vertical camera system 10 pertaining to the present invention. As shown, camera system 10 includes a receptacle to receive, and retain, a cassette 12 containing a roll 14 of photosensitive material. Rollers 16, 18 are driven by a small motor (not shown) to withdraw a length of photosensitive material. A predetermined length of photosensitive material is then cut by a knife blade, and a transport belt mechanism 20 advances the cut length of material onto a glass platen 22. The sheet of material, cut to length, is centered on the platen, and then is positively forced, or drawn down by suction, to press firmly against the platen.

Graphic material is arranged on illuminated copyboard 24, and the camera, represented by lens 26, is adjusted relative to the copyboard. An exposure is then achieved, and the image is recorded on the sized sheet of photosensitive material. The exposed sheet of photosensitive material is then advanced by the transport belt 48 into the nip defined between rollers 28, 30. Rollers 28, 30 are power driven by another small motor (not shown). A compound gear 32 is operatively associated with the rollers 28, 30.

When the operator wishes to make a plate for multiple impressions, a removable transfer cartridge 34 is inserted into the camera system to receive the exposed lengths of photosensitive materials. The cartridge, which trips a switch 36 when inserted into the system, uses gears 38, 40 to drive rollers (not shown) within the cartridge to take up the photosensitive material in light-tight enclosure 34. The cartridge is picked up by handle 42 and removed to an alternative processor for completing the platemaking process.

Under usual conditions of operation, however, cartridge 34 will be absent, and the rollers 28, 30 will propel the sheet of exposed photosensitive material into guide 44, which leads into developer section 46.

Figure 2:
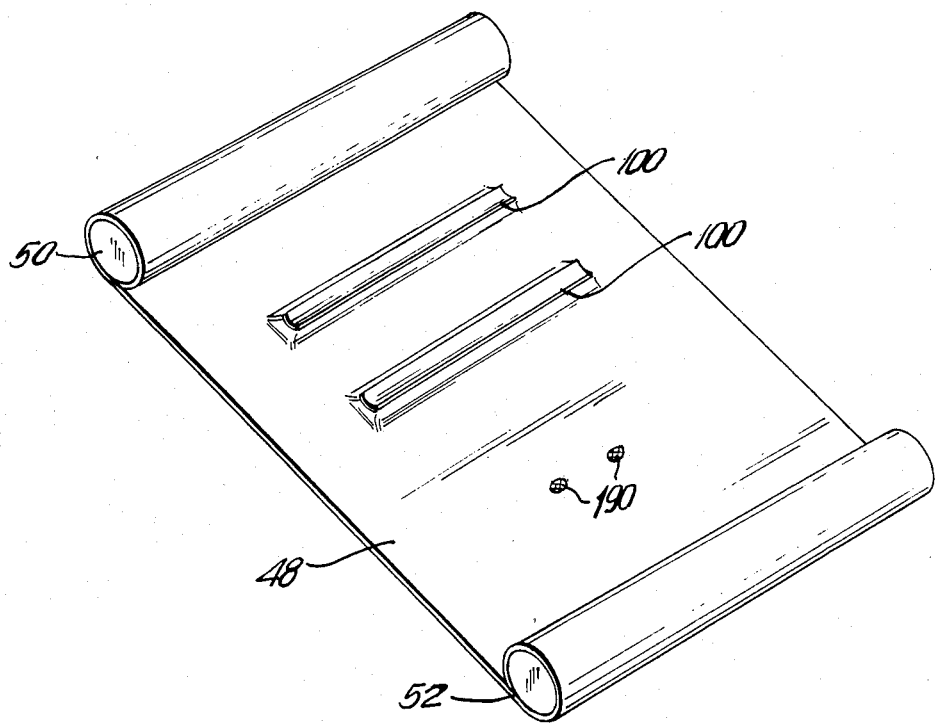
FIG. 2 is a perspective view of a transport belt constructed in accordance with the preferred embodiment of the present invention.

FIG. 2 is a perspective view of the transport belt 48 in accordance with the present invention extending between roller 50, 52 and including resilient belt flexing members 100 disposed on and adhered to the top belt surface. The belt flexing members assume a first, rest position flexing the belt and forming air channels underneath the belt to reduce the length of time required to evacuate air under the belt (see FIG. 3). During vacuum hold down and exposure, the vacuum forces exerted on the belt and, hence, the resilient belt flexing members cause the belt and flexing members to lay substantially flat, with the bottom belt surface pressed flat against the photosensitive material and platen (see FIG. 4). Thus, during exposure the bottom belt surface, substantially free from protrusions and other non-uniformities, presents a uniform background surface.

Referring again to FIG. 2, belt 48 extends between rollers 50, 52. Two belt apertures 190 communicate with a vacuum pick-up bar (not shown) to transmit pick-up vacuum to the bottom belt surface, and the transport belt is lifted and driven back and forth, all in a manner consistent with the foregoing applications. As shown, two belt flexing members 100 are attached to the back of the belt and partially extend transversely across the belt. Of course the number, size and location of the belt flexing members on the top belt surface may be varied within the scope and spirit of the present invention.

Figure 3:
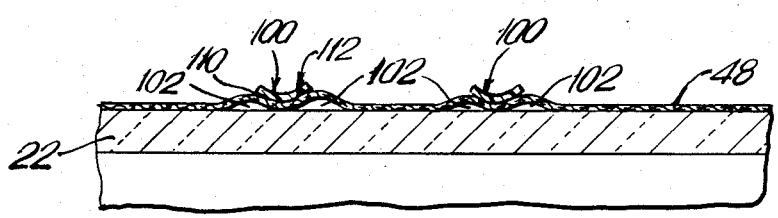
FIG. 3 is a partial cross section view of the transport belt of FIG. 2 relative to the exposure platen, prior to application of hold down vacuum.

FIG. 3 is a partial cross section view showing belt 48 in relation to platen 22 with the belt lowered against the platen but not subject to vacuum hold-down. As shown, prior to application of the hold-down vacuum resilient members 100 assume their curved, rest position. The belt attached to the resilient members also flexes and is lifted away from the platen adjacent the curved ends of resilient flexing members 100 to form air channels 102 underneath the belt. Air channels 102 extend over the length of the belt flexing members and reduce the time required to evacuate air under the belt and achieve hold down for exposure.

Figure 4:
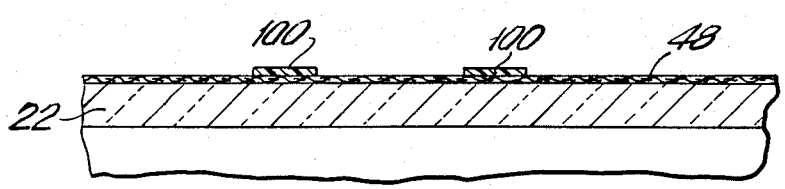
FIG. 4 is a partial cross section view of the transport belt of FIG. 2 relative to the exposure platen, with the belt subject to vacuum hold down.

FIG. 4 is a partial cross section view illustrating the transport belt in accordance with the invention after hold down vacuum has been applied. The vacuum forces evacuate the air beneath the belt and photosensitive material (not shown) to draw the belt firmly against the platen. In the hold down position shown in FIG. 4, resilient belt flexing members 100 assume their flat, flexed position substantially parallel to platen 22. In the hold down position the lower belt surface is flush against the platen and the air channels are eliminated. During exposure, resilient members 100 continue to lay flat under the vacuum forces applied to the belt, permitting the bottom belt surface to present a uniform background during exposures.

Figure 5:
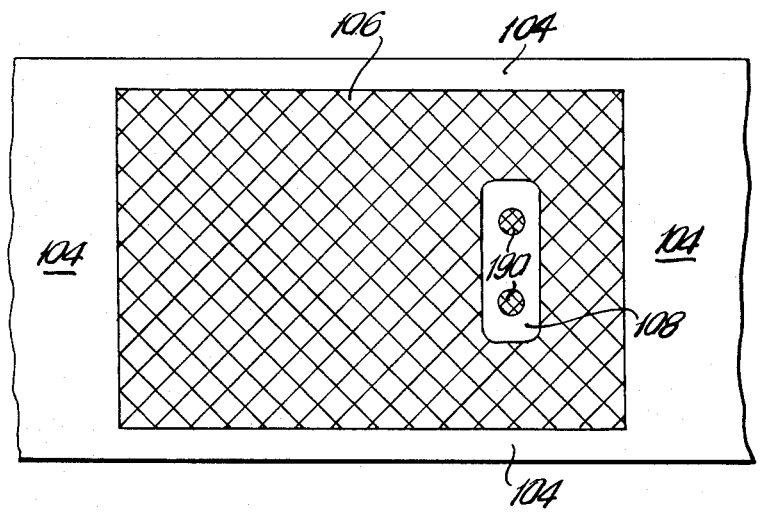
FIG. 5 is a partial plan view of the bottom surface of the transport belt constructed in accordance with the preferred embodiment of the invention.

Preferably, the transport belt is constructed substantially in accordance with the foregoing application Ser. No. 07/149,647, except with respect to the bottom belt surface transverse ribs there disclosed. Thus, a porous woven fabric material, such as a woven polyester fabric, is selectively coated with sealant to provide airtight regions susceptible to vacuum hold down. As disclosed in the foregoing application, the top or back surface of the belt is coated with a sealant, such as plastisol, in all areas overlying the platen during exposure other than porous transport belt openings 190 (see FIG. 2). The bottom or lower surface of the belt is coated with a sealant in areas 104 surrounding the platen, as shown in FIG. 5, thereby defining an uncoated fabric "window area" 106 on the bottom surface substantially overlying the platen during exposure. Preferably, sealant is also selectively applied in region 108 surrounding transport belt openings 190 in order to enhance pick-up suction. Although plastisol is also an appropriate sealant for the bottom belt surface, it has been found that plastisol may release substances capable of causing interference patterns in line screen exposures and/or deterioration of graphic art screens. Polyurethane, on the other hand, has been found to be an appropriate bottom surface sealant not susceptible to these drawbacks.

Resilient belt flexing members 100 preferably constitute curved plastic members having memory. The curved plastic members are preferably in the shape of a section of a cylinder, and may be made by forming a heat formable plastic sheet, such as triacetate film 7/1000 of one inch thick, around a plastic rod two inches in diameter. Sections of the resulting cylindrically shaped tube approximately 0.75 inches wide and 11.75 inches long having a radius of curvature of approximately one inch are cut out to provide a resilient member having an outer, convex surface 110 and an inner, concave surface 112.

The curved plastic members are preferably attached to the top belt surface using a transfer adhesive, e.g. double sided tape. The transfer adhesive is preferably applied to convex surface 110 and the curved plastic members are positioned transversely on the top belt surface as shown in FIG. 2. Pressure is then applied to obtain secure adherence of the plastic members to the plastisol coated top belt surface. By way of example only, the height of the curved plastic member, i.e. the distance from the apex of convex surface 110 to a cord between the ends of the curved plastic member, is in the range of about 0.0625 inches to 0.08 inches.

Figure 6:
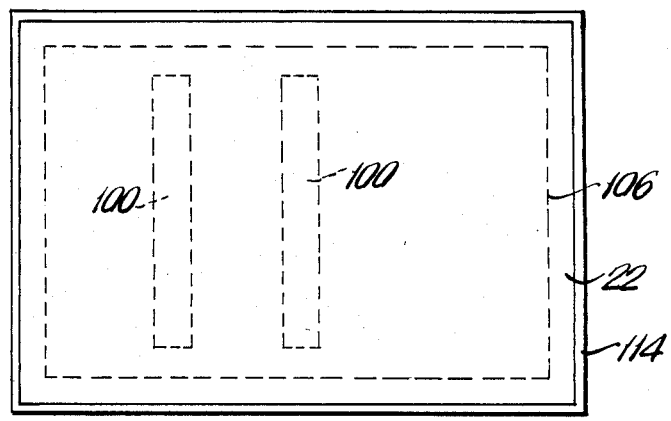
FIG. 6 is a top plan view of the exposure platen and peripheral vacuum channel, illustrating the relative dimensions and positions of the transport belt window area and belt flexing members in phantom.

In FIG. 6, a top plan view of platen 22 and peripheral vacuum channel 114, the relative size and position of window area 106 and resilient flexing members 100 are shown in phantom. As there shown, peripheral hold-down vacuum channel 114 surrounds platen 22, which is an optical quality glass plate. Window area 106 overlies substantially all of the platen but does not extend over the side edges of the platen to the peripheral channel. That is, a sealed portion of the bottom belt surface overlaps the vacuum channel. As pointed out in application Ser. No. 07/149,647, the preferred set-back distance for window area 106 from the edge of the glass platen and vacuum channel 114 is approximately one-eighth to one-half inch. As shown, resilient members 100 are preferably disposed on the top belt surface in regions wholly overlying window area 106. Preferably, resilient members 100 extend transversely across a portion of the top belt surface with the ends of the resilient members approximately 0.38 inch from the side edges of the window area.

In use, the vacuum feed and hold down system is activated to withdraw and cut a sheet of photosensitive material from cassette 12. In accordance with the foregoing applications, vacuum is applied to transport belt openings 190 to adhere the photosensitive sheet to the underside of the belt. The vacuum pick-up bar is then lifted and the belt is advanced to transport the photosensitive sheet to the center of platen 22. In accordance with the foregoing applications, the vacuum pick-up bar is lowered so that the photosensitive material is placed face down on the center of the platen with the belt overlying the photosensitive material.

At this point, prior to initiating hold-down vacuum at peripheral channel 114, the resilient belt flexing members 100 assume the first, curved rest position shown in FIG. 3. During application of hold down vacuum via channel 114, air channels 102 formed by resilient members 100 reduce the amount of time required to evacuate air under the belt and photosensitive material. However, as the vacuum force on the belt increases and draws the belt tightly against the platen, the flexing force of resilient members 100 is overcome and the resilient members 100 are flexed to lay flat against the platen (see FIG. 4). In this, the exposure position, the air channels are eliminated and the bottom belt surface lays flat, presenting a substantially uniform background surface. As shown in FIG. 4, the resilient members are flexed and lay flat, substantially parallel to platen 22.

Thus, the transport belt in accordance with the present invention including belt flexing members 100 reduces the length of time required to evacuate air beneath the transport belt for hold down. Remarkably, however, the bottom belt surface and, more specifically, window area 106, present a substantially flat, uniform background surface during exposure, thereby permitting high quality line screen film exposures without shadow variation effects. In the preferred embodiment wherein a clear polyurethane sealant is used on the bottom belt surface, the presence of the clear sealant surrounding the transport belt openings goes undetected and does not affect image quality. Surprisingly, in the preferred embodiment of the invention wherein curved plastic members are adhered at their convex surface to the top belt surface, the natural curvature of the plastic member conforms substantially to rollers 50, 52 when the belt is wound up around the rollers. Advantageously, this relationship helps preserve the natural, curved surface memory of the plastic members, thereby contributing to the long term effectiveness of the resilient belt flexing members.

Figure 7:
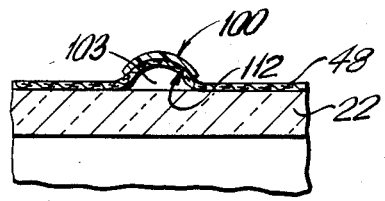
FIG. 7 is a partial cross section view of a belt flexing member in accordance with a first alternative embodiment of the invention.

In a first alternative embodiment, the preferred curved plastic member may be adhered to the top belt surface in the position shown in FIG. 7. As there shown, concave surface 112 of the preferred curved plastic member 100 is adhered to the belt to form a single, larger air channel 103. As in the preferred embodiment, the downward forces exerted on the belt and, hence, the resilient member during vacuum hold down overcome the flexing force of the resilient member so that the flexing member assumes the exposure position illustrated in FIG. 4.

Figure 8:
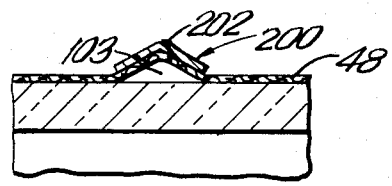
FIG. 8 is a partial cross section view of a belt flexing member in accordance with a second alternative embodiment of the invention.
Figure 9:
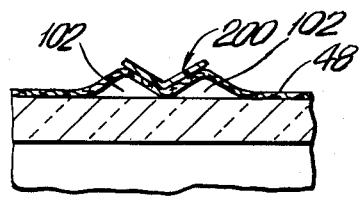
FIG. 9 is a partial cross section view of a belt flexing member in accordance with a third alternative embodiment of the invention.

Further alternative configurations of the resilient belt flexing members are shown in FIGS. 8 and 9. There, the resilient belt flexing member 200 is illustrated as having a substantially "V" shape. In these second and third alternative embodiments, the V-shaped belt flexing member is alternatively adhered to the top belt surface at either the concave (FIG. 8) or convex (FIG. 9) surface. In order to ensure that the V-shaped member assumes a substantially flat position during vacuum hold down, it is contemplated that a living hinge with memory might be provided at the apex 202 of resilient member 200.

Figure 10:
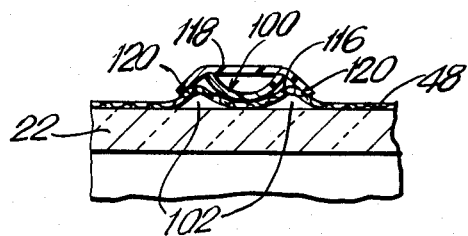
FIG. 10 shows a fourth alternative embodiment of the present invention with the preferred curved plastic belt flexing member disposed in a pocket provided on the top belt surface.

It is also contemplated that the resilient belt flexing member could be secured to the top belt surface in a variety of ways. In a fourth alternative embodiment shown in FIG. 10, the preferred curved plastic member 100 is disposed in a pocket 116 formed by attaching a pocket layer 118 to the top belt surface at attachment points 120. As shown, when the curved plastic member assumes the first, rest position the upward force exerted on the pocket layer 118 lifts the belt at attachment points 120 to form air channels 102. Similar results could be obtained by gluing the resilient member to the top belt surface or encapsulating the curved plastic member within the plastisol coating on the top belt surface.

Of course, numerous additional variations of the transport belt in accordance with the present invention may be devised by persons of ordinary skill in the art by practice with the invention, including but not limited to variations in the number, shape, location, and method of attachment of the resilient belt flexing members.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. In a camera including a supply of photosensitive material, a platen to receive the photosensitive material, a vacuum feed and hold down system including a transport belt held down by vacuum against the platen for exposure, and an optical system to expose the photosensitive material, the improvement comprising:
    a movable flexible opaque transport belt disposed substantially parallel to the platen, said transport belt having a top belt surface away from the platen and a bottom belt surface facing the platen; and
    at least one resilient belt flexing member adhered to said top belt surface, said belt flexing member assuming a first position creating at least one air channel underneath said belt when said belt is not subject to vacuum hold down, said resilient belt flexing member assuming a second, flexed position substantially parallel to the platen during vacuum hold down, said bottom belt surface pressing against the platen when said resilient belt flexing member assumes said second position, thereby providing a substantially flat background surface during exposure.

2. The transport belt according to claim 1 wherein said transport belt flexing member further comprises a curved plastic member having memory.

3. The transport belt according to claim 2 wherein said curved plastic member is made from a heat formable plastic sheet.

4. The transport belt according to claim 2 wherein said curved plastic member has a radius of curvature of approximately one inch.

5. The transport belt according to claim 2 wherein said curved plastic member is adhered to said belt by a transfer adhesive.

6. The transport belt according to claim 2 wherein said curved plastic member is glued to said belt.

7. The transfer belt according to claim 2 wherein said curved plastic member is adhered to said belt by being disposed in a pocket provided on said top belt surface.

8. The transport belt according to claim 1 wherein said resilient belt flexing member extends transversely across said belt.

9. The transport belt according to claim 8 wherein said resilient belt flexing member extends over a portion of the exposure platen.

10. The transport belt according to claim 9 wherein said resilient belt flexing member does not extend over the hold down vacuum source.

11. The transport belt according to claim 2 wherein said curved plastic member has a concave surface and a convex surface, said concave surface facing away from said top belt surface.

12. The transport belt according to claim 2 wherein said curved plastic member has a concave surface and a convex surface, said concave surface facing said top belt surface.

13. The transport belt according to claim 11 wherein two air channels are formed underneath said belt when said belt flexing member assumes said first position.

14. In a camera including a supply of photosensitive material, a platen to receive the photosensitive material, a vacuum feed and hold down system including a transport belt held down against the platen for exposure by vacuum applied to a channel adjacent the platen, and an optical system to expose the photosensitive material, the improvement comprising:

a movable flexible opaque transport belt disposed substantially parallel to the platen, said transport belt having a top belt surface away from the platen and a bottom belt surface facing the platen, said transport belt being made of a porous woven fabric belt coated with a sealant on substantially all of said top belt surface overlying said platen during exposure, said porous woven fabric belt being coated with a sealant on said bottom belt surface in substantially all regions surrounding said platen, thereby defining an uncoated window area on said bottom belt surface overlying substantially all of said platen during exposure; and at least one resilient belt flexing member adhered to said top belt surface, said belt flexing member assuming a first position to create at least one air channel underneath said belt when said belt is not subject to hold down vacuum, said resilient belt flexing member assuming a second, flexed position substantially parallel to the platen during vacuum hold down, said bottom belt surface pressing against the platen when said resilient belt flexing member assumes said second position, thereby providing a substantially uniform flat background surface during exposure.

15. The transport belt according to claim 14 wherein said window area does not extend over the vacuum channel adjacent the sides of said platen.

16. The transport belt according to claim 15 wherein said resilient belt flexing member is transversely disposed on said top belt surface within a top belt surface region corresponding to said window area, said transverse resilient belt flexing member having a length shorter than the width of said window area.

17. The transport belt according to claim 16 wherein said resilient belt flexing member further comprises a curved plastic member having memory.

18. The transport belt according to claim 17 wherein said curved plastic member has a radius of curvature of approximately one inch.

19. The transport belt according to claim 17 wherein said curved plastic member is adhered to said top belt surface at the outer convex surface of said curved plastic member.

20. The transport belt according to claim 17 wherein said curved plastic member is adhered to said top belt surface at the inner, concave surface of said curved plastic member.

21. The transport belt according to claim 14 wherein said resilient belt flexing member has a V shape.

22. The transport belt according to claim 14 wherein said resilient belt flexing member is adhered to said top belt surface by being disposed in a pocket provided on said top belt surface.

23. The transport belt according to claim 14 wherein the sealant coated on said top belt surface further comprises plastisol.

24. The transport belt according to claim 14 wherein the sealant coated on said bottom belt surface further comprises polyurethane.

* * * * *